United States Patent [19]
Park et al.

[11] 3,940,682
[45] Feb. 24, 1976

[54] RECTIFIER CIRCUITS USING TRANSISTORS AS RECTIFYING ELEMENTS

[75] Inventors: John N. Park, Rexford; Robert L. Steigerwald, Scotia; Loren H. Walker, Schenectady, all of N.Y.

[73] Assignee: General Electric Company, Schenectady, N.Y.

[22] Filed: Nov. 22, 1974

[21] Appl. No.: 526,117

Related U.S. Application Data

[63] Continuation of Ser. No. 406,162, Oct. 15, 1973.

[52] U.S. Cl.................................. 321/47; 321/2
[51] Int. Cl.²................... H02M 7/23; H02M 7/21
[58] Field of Search................................. 321/2, 47

[56] References Cited
UNITED STATES PATENTS

| | | | |
|---|---|---|---|
| 3,581,186 | 5/1971 | Weinberger | 321/47 X |
| 3,582,758 | 6/1971 | Gunn | 321/47 |
| 3,667,028 | 5/1972 | Leufgen | 321/47 |
| 3,735,235 | 5/1973 | Hamilton et al. | 321/2 |

FOREIGN PATENTS OR APPLICATIONS

| | | | |
|---|---|---|---|
| 176,133 | 8/1961 | Sweden | 321/47 |

OTHER PUBLICATIONS

IBM Journal, "A Symmetrical-Transistor Steering Circuit," J. L. Walsh, Apr., 1957, pp. 185–188.

*Primary Examiner*—William M. Shoop
*Attorney, Agent, or Firm*—Donald R. Campbell; Joseph T. Cohen; Jerome C. Squillaro

[57] ABSTRACT

Full-wave and half-wave rectifier circuits are disclosed; the former circuit using two transistors and the latter circuit using one transistor. In both circuits transistors are connected in an inverted mode so that, for example, with an NPN transistor current flow is such that line current flows into the emitter and load current flows out of the collector. Furthermore, voltage blocking is performed by the collector-base junction instead of the emitter-base junction. High efficiency is achieved by controlling the transistor base current in response to the emitter current so that the base current is proportional to the emitter current and is also at an optimum magnitude so as to minimize circuit losses.

2 Claims, 2 Drawing Figures

RECTIFIER CIRCUITS USING TRANSISTORS AS RECTIFYING ELEMENTS

This is a continuation of application Ser. No. 406,162, filed Oct. 15, 1973.

BACKGROUND OF THE INVENTION

The subject invention pertains, in general, to rectifier circuits employing active solid state rectifying elements, or devices; and, in particular, to rectifier circuits employing transistors as rectifying elements, or devices. The subject invention pertains, more particularly, to the employment of transistors connected in an unusual arrangement and serving as rectifying elements, or devices.

There are many applications which require a small volume, lightweight, power supply unit including a rectifier. For example, such a power supply unit may be incorporated in a conventional two, or three, conductor line cord at one end of the cord and incorporated in a male plug adapted for connection with a wall receptacle which supplies a single phase, 60 Hertz source of 120 volts. The power supply unit converts, or changes, the supplied phase, frequency and voltage to suit the appliance(s) which are intended to be connected to the end of the cord. The described assembly is often called a line cord power supply. The power supply itself is a small, compact, lightweight unit which is usually integral with the line cord and is supported by the line cord.

The small volume, lightweight power supply unit, hereinbefore discussed, includes a rectifier. The rectifier must be of small volume and lightweight. Another important requirement respecting such rectifiers is that high efficiency rectification be achievable. Furthermore, rectifier operation should be stable for long periods of time even under adverse ambient temperatures and humidity. In addition, such rectifiers should be relatively inexpensive.

The aforementioned requirements have not been satisfactorily met in cases where such rectifiers are intended to operate at relatively low voltages, relatively high current and relatively high frequencies (e.g., 10 volts or less, up to several amperes and up to 50 kilohertz.) Known efforts employing such passive rectifying elements, or devices, as silicon diodes, Schottky diodes and germanium diodes have not proved satisfactory. For example, a simple, full-wave rectifier circuit using silicon diodes exhibits poor rectification efficiency where the load voltage is below 10 volts. The poor efficiency is due to the inherent forward voltage drop of the silicon junction which, for low cost diodes, is about 1 volt at 1 ampere when the silicon diodes are operating near their ratings. Also, additional power dissipation in the form of switching losses occurs due to high frequency operation; the high frequency being necessary for the employment of minimum volume magnetic components which are necessary in other parts of the rectifier circuit. As another example, high voltage Schottky (hot carrier) diodes are large area devices and are not suitable because, among other reasons, they are difficult to incorporate economically in integrated circuits. As a further example, germanium diodes are not generally suited for rectification at high frequencies. Moreover, germanium diodes are not suitable for integrated circuit fabrication.

The use of active devices, such as transistors, as rectifying elements is also known. See, for example, the article "New Techniques in Power Control" by J. B. Gunn, *Digest of Technical Papers*, 1970 IEEE International Solid State Circuit Conference, at pages 90 and 91. The rectifier circuit hereinafter disclosed in detail represents a departure from the rectifier circuit disclosed in the Gunn article.

SUMMARY OF THE INVENTION

One object of the invention is to provide a high efficiency rectifier circuit.

Another object of the invention is to provide a small volume, lightweight rectifier.

Another object of the invention is to provide a rectifier circuit employing active solid state rectifying means.

Another object of the invention is to provide a rectifier circuit employing active semiconductor rectifying means.

Another object of the invention is to provide a rectifier circuit employing economical, state-of-the-art, active, solid state rectifying means.

Another object of the invention is to provide a rectifier circuit employing economical, state-of-the-art, active, semiconductor rectifying means.

Another object of the invention is to provide a rectifier circuit employing transistors as rectifying means.

Another object of the invention is to provide a high efficiency, full-wave rectifier circuit.

Another object of the invention is to provide a high efficiency, half-wave rectifier circuit.

Another object of the invention is to provide a high efficiency, rectifier circuit operating at relatively high frequency, relatively low voltage and relatively high current.

Another object of the invention is to provide a rectifier circuit employing transistors which may be fabricated as part of an integrated circuit assembly.

One feature of the rectifier circuit according to the invention is the employment of a transistor which is connected in an inverted mode so that voltage blocking is performed by the collector-base junction of the transistor rather than the emitter-base junction, the normal collector and emitter current flow directions being reversed. One advantage of the aforementioned inverted mode transistor connection is that available silicon transistors may be used despite their having a relatively low value of $BV_{EBO}$ since the voltage blocking function is performed by the collector-base junction. Another advantage is that conventional transistor designs having low $R_{sat}$, high $h_{FE}$ (inverted) exhibit very low $V_{CE}$ (SAT) for inverted conduction. In one exemplary embodiment (full-wave rectifier) hereinafter described and illustrated in the accompanying drawing two transistors are employed in the aforesaid inverted mode. In a second exemplary embodiment (half-wave rectifier) hereinafter described and illustrated in the accompanying drawing one transistor is employed in the aforesaid inverted mode.

Another feature of the rectifier circuit according to the invention is the employment of a current control transformer for controlling the base current of each transistor in response to the current to, for example, the emitter in an NPN transistor. The base current is controlled so that it is maintained at a near optimum magnitude; i.e., a magnitude not in excess of that required so that circuit losses are kept to a minimum.

Another feature of the rectifier circuit according to the invention is the use of two separate sets of current control transformer windings which share a common magnetic core in the full-wave rectifier embodiment of the invention. One advantage of using the common magnetic core is that the overall size is minimized due partly to the sharing of the magnetic core material. However, the overall size of the transformer is minimized primarily because of the cancellation of the d.c. component of magnetic flux resulting from currents from the two transistors employed.

Another feature of the rectifier circuit according to the invention is the employment of a diode in combination with each transistor; the diode being connected between the emitter and collector of the transistor with which it is associated. One advantage of using the diode is that at start-up of the rectifier circuit the diode provides a path for the initial rectified current at turn "on" of the transistor with which it is associated. An additional advantage is that the aforesaid initial rectified current flows in an associated winding of the current control transformer and forces the initiation of regenerative action by the transformer thereby improving switching efficiency of the transistor of which it is associated.

Other objects, as well as other features and advantages of the invention appear hereinafter whereat two exemplary embodiments of the invention (a full-wave rectifier circuit and a half-wave rectifier circuit) are disclosed for the purpose of illustrating the invention; said disclosures including the accompanying drawing figures, the content of which is hereinafter described.

DRAWINGS

DETAILED DESCRIPTION

Figure 1:
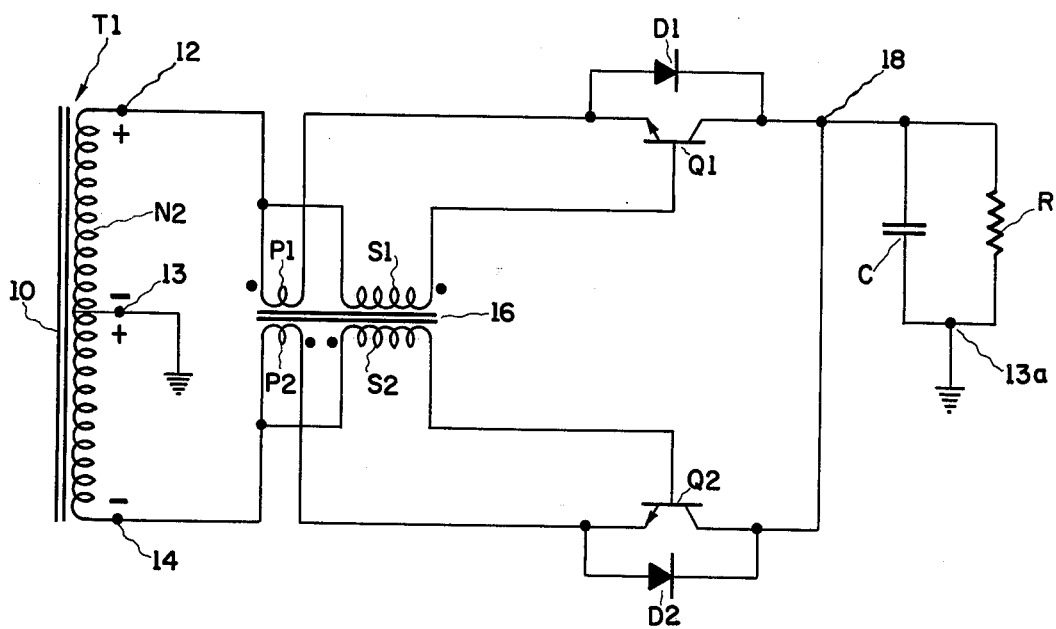
FIG. 1 is a schematic diagram of a full-wave rectifier circuit in accordance with one exemplary embodiment of the invention.

The full-wave rectifier circuit shown at FIG. 1 employs a power transformer designated, generally, by the reference T1. Transformer T1 includes a magnetic core 10 which has a secondary winding N2 wound thereabout in addition to a primary winding (not shown). The magnetic core 10 is preferably of ferrite material inasmuch as transformer T1 is intended to operate at a relatively high frequency (e.g., up to 50 kilohertz). As shown, the secondary winding N2 has two terminals 12 and 14 at opposite ends thereof. Also, the secondary winding N2 has a third terminal 13 which is between the end terminals 12 and 14. In the circuit of FIG. 1 the terminal 13 is midway between the terminals 12 and 14 so that the secondary voltage magnitude between terminals 12 and 13 is the same as that between the terminals 13 and 14. Also, as shown, the terminal 13 serves as a reference point or ground. During a half cycle of single phase voltage applied to the transformer T1 the relative voltage polarities at the terminals 12, 13 and 14 are as indicated at FIG. 1. For example, terminal 12 is marked with a plus sign (+) and terminal 13 is marked with a negative sign (−) to indicate that terminal 12 is positive relative to terminal 13. In turn, terminal 13 is also marked with a plus sign (+) and terminal 14 is marked with a negative sign (−) indicating that the terminal 13 is positive relative to terminal 14. As is well known, during the next succeeding half cycle of single phase voltage applied to transformer T1 the relative voltage polarities of the aforesaid terminals on the secondary winding N2 reverse.

As shown at FIG. 1, two NPN silicon junction transistors Q1 and Q2 are provided. Each transistor has an emitter, a base and a collector. A diode D1 is connected between the emitter and collector of transistor Q1; the anode of diode D1 being connected to the emitter of transistor Q1 and the cathode of diode D1 being connected to the collector of transistor Q1. Similarly, a diode D2 is connected between the emitter and collector of transistor Q2; the anode of diode D2 being connected to the emitter of transistor Q2 and the cathode of diode D2 being connected to the collector of transistor Q2.

As shown at FIG. 1, each transistor Q1 and Q2, has a separate set of current control transformer windings associated therewith. A first set of current control transformer windings associated with transistor Q1, includes a primary winding P1 and a secondary winding S1. The primary and secondary windings P1 and S1 are magnetically coupled with each other. A second set of current control transformer windings, associated with the transistor Q2, includes a primary winding P2 and a secondary winding S2. The primary and secondary windings P2 and S2 are also magnetically coupled with each other. A single closed magnetic core 16 is commonly shared by all of the windings P1, S1, P2 and S2. Since the circuit of FIG. 1 handles high frequencies, (up to 50 kilohertz) the core 16 is of ferrite material. The primary and secondary windings P1 and S1 (associated with transistor Q1) are wound on the core 16 so that they have the relative winding polarities indicated at FIG. 1 by the black dots in accordance with convention; i.e., the end of winding P1 which is connected to terminal 12 of transformer T1 has the same polarity as that end of winding S1 which is connected to the base of transistor Q1. The primary and secondary windings P2 and S2 (associated with transistor Q2) are wound on the core 16 so that they have the relative winding polarities indicated by the black dots shown in FIG. 1 in accordance with convention; i.e., the end of the winding P2 which is connected to the terminal 14 of transformer T1 has the same polarity as that end of the winding S2 which is connected to the base of the transistor Q2. However, as indicated at FIG. 1 the relative winding polarities of the windings P1 and S1 are the reverse of the relative winding polarities of the windings P2 and S2.

As shown, in the full-wave rectifier circuit of FIG. 1 the collectors of both transistors, Q1 and Q2, are connected together at a common output terminal 18, or node. A resistive load element R is connected between the output terminal 18 and a reference terminal 13a, or ground. Also, a capacitor C is arranged in parallel with the resistive element R such that one end of capacitor C is connected to the output terminal 18 while the other end of the capacitor C is connected to the reference terminal 13a, or ground.

The windings P1 and S1 are arranged relative to the power transformer T1 and the transistor Q1 such that the primary winding P1 is connected in series between the terminal 12 of transformer T1 and the emitter of transistor Q1. As shown, one end of the secondary winding S1 is connected to that end of the primary winding P1 which is connected to the terminal 12 of the transformer T1. The other, or opposite, end of secondary winding S1 is connected to the base of transistor Q1. Similarly, the windings P2 and S2 are arranged relative to transformer T1 and transistor Q2 such that the primary winding P2 is connected in series between the terminal 14 of transformer T1 and the emitter of transistor Q2. As shown one end of the secondary winding S2 is connected to that end of the primary winding P2 which is connected to terminal 14 of transformer T1. The other, or opposite, end of secondary winding S2 is connected to the base of transistor Q2.

OPERATION

The transformer T1 in the full-wave rectifier circuit of FIG. 1 may be supplied with a single phase voltage, the waveform of which is either sinusoidal or is a square wave. It is often easier, and more economical, to generate non-sinusoidal waveforms. Therefore, it is assumed in the discussion hereinafter set forth, that the voltages between terminals 12 and 13 and between terminals 13 and 14 are single phase, square wave voltages. Such waveforms could, for example, be supplied to the primary winding (not shown) of the power transformer T1 from the output terminals of a high frequency inverter circuit like or similar to the one disclosed in U.S. patent application Ser. No. 267,262, filed June 28, 1972, now U.S. Pat. No. 3,781,638 issued Dec. 25, 1973. The patent application and the invention therein disclosed and the patent application of which this specification is a part as well as the invention herein disclosed being assigned to the same assignee. The frequency of the single phase voltage supplied to transformer T1 is preferably relatively high; e.g., 20 kilohertz or more. The use of high frequencies is desirable because the volume and weight of the magnetic materials may be considerably reduced.

For purposes of discussion it is assumed initially that the square wave voltage across the winding N2 of transformer T1 is in its first half-cycle excursion and going positive so that the terminals 12, 13 and 14 of the secondary winding N2 of transformer T1 have the instantaneous relative voltage polarities indicated at FIG. 1. Thus, in accordance with conventional current direction respecting the polarities involved, current initially is from the positive terminal 12 into and through primary winding P1, through the diode D1 (from anode to cathode thereof) and into the output terminal 18 from which it eventually goes into capacitor C and the resistive load element R. With the initial or starting current as aforesaid the output terminal 18 is of a positive potential relative to the reference, or ground, terminal 13a. Although the diode D1 is initially conductive (because of the positive polarity at terminal 12) and the starting current is as aforesaid the transistor Q1 is "off;" i.e., non-conducting. Indeed the transistor Q1 remains "off" for a short period while the diode D1 conducts the aforesaid initial, or starting, current. Because of the relative negative polarity at terminal 14 the diode D2 does not conduct. The transistor Q2 is also "off;" i.e., non-conducting. Since the diode D2 is non-conductive the current control transformer windings P2 and S2 cannot develop the necessary base current to turn the transistor Q2 "on." Thus, transistor Q2 is "off" or, non-conducting. The collector-base junction of transistor Q2, which is normally the higher voltage junction, blocks essentially the full voltage between terminals 12 and 14.

The current in diode D1 is also in winding P1. Due to current transformer action a proportional current appears in winding S1. Consequently, there is initiated a current into the base of transistor Q1. Because of the aforesaid base current the transistor Q1 is turned "on" (i.e., becomes conducting) and provides a low impedance path from terminal 12 to terminal 18. However, transistor Q1 is not turned "on" at the same instant of time that the diode D1 began conducting. There is a short time delay before transistor Q1 becomes turned "on." The use of the diode D1 permits the rapid initiation of base current in transistor Q1 thereby turning Q1 "on" rapidly. The aforementioned short time delay period between turn-on of diode D1 and turn-on of transistor Q1 is considerably shortened because as soon as the diode D1 begins to conduct, the secondary winding S1 injects a current into the base of transistor Q1 so as to cause the rapid turn-on of transistor Q1. When the transistor Q1 is turned "on" and is conducting it shunts the diode D1 and, in effect, the voltage drop across the diode D1 is considerably lowered. Eventually, the current in diode D1 goes to zero due to the shunting action of transistor Q1.

Before continuing with the discussion of the operational events involved it is important to emphasize a unique feature of the invention; namely, the way in which transistor Q1 (and transistor Q2, as well) are connected in the rectifier circuit shown at FIG. 1. Both transistors Q1 and Q2 are connected in a reverse or inverted mode. In FIg. 1 the symbols identified as Q1 and Q2 represent NPN transistors which in the exemplary full-wave rectifier circuit are NPN silicon junction transistors. Each transistor as indicated has an emitter, base and collector which are shown in the conventional way; e.g., the emitter is represented as an arrow which points in a direction away from the emitter-base junction of the transistor. The NPN transistor is normally employed in switching circuits in such a way that current is into its collector toward the collector-base junction and out of its emitter away from the base-emitter junction. However, when the transistors Q1 and Q2 (FIG. 1) are turned "on" and are conducting their emitter currents are into the transistor toward the base-emitter junction and their collector currents are out of the transistor and away from the collector-emitter junction. Thus, in FIG. 1 (and in FIG. 2, as well) the conventional transistor symbols are used and the emitter, collector and base leads are identifiable as in the particular manufacturers device. However, in FIG. 1 and in FIG. 2 the current directions as hereinbefore described are the reverse of the normal current directions. The advantages of using the transistors in the aforesaid inverted mode connection are as follows: losses are minimized due to the low-transistor saturation voltage thereby enabling high efficiency rectification operation; and, voltage blocking may be performed by the collector-base junction rather than the emitter-base junction so that low cost, readily available, silicon transistors normally having a relatively low $BV_{EBO}$ may be used. The foregoing parameters are known to those who are skilled in transistor technology. For a detailed meaning of the foregoing parameters (e.g., $BV_{EBO}$), etc. see the publication *GE Transistor Manual*, revised 7th Edition, edited and produced by Semiconductor Products Department, General Electric Company, Electronics Park, Syracuse, N.Y.

The primary winding P1 and the secondary winding S1 also perform the important function of controlling, or regulating, the magnitude of the base control of transistor Q1. The base current magnitude is controlled such that it is proportional to the emitter current magnitude. Since emitter current passes through the primary winding P1 the magnetic coupling between the windings P1 and S1 enables the secondary winding S1 to develop a voltage of proper magnitude and polarity, in response to the emitter current in the primary winding P1, to cause a base current of near optimum magnitude. More particularly, the base current magnitude is proportional to the magnitude of the emitter current. If the base current has a greater magnitude than is required for sustaining conduction in the transistor the excess base current causes losses, the magnitude of which may be significant. Hence, in optimizing the base current the ideal situation to be achieved would be to provide base current of a magnitude which is sufficient to minimize the voltage drop between terminals 12 and 18, therefore, the action of the windings P1 and S1 is to approach the aforesaid ideal situation as closely as is possible. Therefore, high efficiency is maintained at all levels of load current since base current is proportional to collector current and is never significantly in excess of that required.

Returning to the circuit of FIG. 1 and to the sequence of operational events, transistor Q1 is "on" and continues to conduct after the current in diode D1 goes to zero due to the shunting action, as aforesaid, of transistor Q1. As long as the transformer terminal 12 is positive and the diode D1 and/or transistor Q1 are "on" and conducting, the current out of the collector of transistor Q1 to the output terminal 18 charges the capacitor C. Due to the current out of the collector of transistor Q1, the charge on capacitor C builds up and the voltage on the output terminal 18 approaches the peak voltage at transformer terminal 12. The output terminal 18 and the upper plate (FIG. 1) of the capacitor C are charged to a positive potential, the magnitude of which is the peak positive voltage of the positive square wave voltage occurring at terminal 12 during the each positive half cycle of the square wave voltage across winding N2 of transformer T1. Because of the parallel connection, the resistive element R has the same voltage across it as across the capacitor C. At the end of the positive half cycle, the positive voltage at terminal 12 begins to diminish in amplitude, or magnitude, as it starts to fall toward zero volts. At some point during its fall toward zero volts the diminishing positive voltage at the terminal 12 becomes less positive than the positive voltage at the output terminal 18. As a result, current momentarily reverses its direction and is now from terminal 18, into the collector of transistor Q1, out of the emitter of transistor Q1 and into the primary winding P1. Since current is now out of the emitter of transistor Q1, through the primary winding P1 in a reverse direction, the relative voltage polarity on the winding S1 also changes so that base current is out of transistor Q1. The aforementioned base current is in such a direction as to hasten the turn "off" of transistor Q1. Thus, for transistor Q1 the collector, emitter and base currents are reversed until the stored charges in the transistor Q1 are depleted. These reversed currents in transistor Q1 may continue even when the voltage at the terminal 12 becomes zero. While transistor Q1 is conducting current in the reverse direction as aforesaid the terminal 14 of transformer T1 is getting more positive relative to terminal 13. The terminal 14 is getting even more positive relative to terminal 12. During this short period of reverse conduction in transistor Q1 the positive potential at the output terminal 18 is diminishing due to the discharge of the capacitor C into the collector of transistor Q1.

Meanwhile, when the increasing positive potential at terminal 14 exceeds the decreasing positive potential at terminal 18 the diode D2 turns "on." Thus, with the diode D2 and the transistor Q1 both on "on," current is from the cathode of diode D2 to the terminal 18 and into the collector of transistor Q1. Shortly after the diode D2 turns "on," as aforesaid, the transistor Q2 is turned "on." The transistor Q2 becomes conducting (i.e., turned "on") when base current is supplied thereto from the secondary winding S2. Thus, transistor Q2 becomes turned "on" by a sequence of events similar to those hereinbefore described with reference to the initial turning "on" of the transistor Q1. When transistor Q2 turns "on" the current in diode D2 goes to zero due the shunting action of transistor Q2. For a very short period of time both transistors Q1 and Q2 may be "on" due, primarily, to stored charge in that transistor which is about to turn "off." Also, the period of simultaneous conduction of both transistors could be extended by the inductance of the source T1. For transistor Q1 current is into its collector, out of its emitter and out of its base. For transistor Q2 current is into its emitter, into its base and out of its collector. With its base current reversed, as aforesaid, transistor Q1 eventually turns "off." Turn "off" of transistor Q1 is hastened by the polarity reversal of the winding S1. Such polarity reversal is caused by the emitter current in the reverse direction in the winding P1. Advantageously, since the windings P1 and S1 hasten the turn "off" of transistors Q1 the switching losses in the transistor Q1 are minimized. With terminal 14 positive with respect to terminals 13 and 12 the transistor Q2 continues conducting such that current is from terminal 14 through the primary winding P2 and into the emitter of transistor Q2. Also, current is out of the collector of transistor Q2 and into the output terminal 18. In addition, base current is through the secondary winding S2 and into the base of transistor Q2. As was the case when the transistor Q1 began to conduct initially the collector and emitter currents for transistor Q2 are the reverse of what they would ordinarily be. Thus, the transistor Q2, like transistor Q1, is effectively employed in a reverse or inverted connection mode.

Also, the relative polarities of windings S1 and S2 are such that the forward base-emitter voltage on the conducting one of the two transistors is impressed as a reverse base-emitter voltage on the blocking, or non-conducting, transistor thereby assuring reliable voltage blocking.

Figure 2:
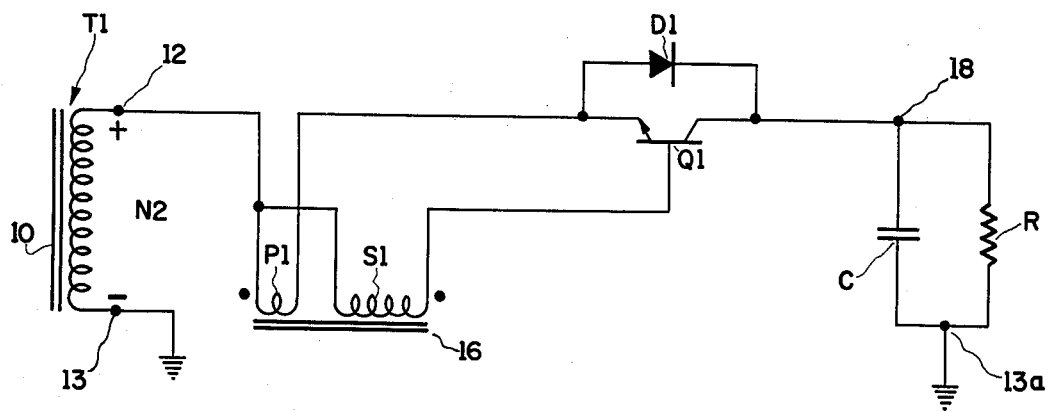
FIG. 2 is a schematic diagram of a half-wave rectifier circuit in accordance with a second exemplary embodiment of the invention.

At FIG. 2 there is illustrated in schematic diagram form another embodiment of the rectifier circuit according to the invention. At FIG. 2 a half-wave rectifier is shown. Essentially, the circuit of FIG. 2 is the same as the upper half of the circuit shown in FIG. 1 and operates in essentially the same manner, except that the output is a half-wave output.

In FIGS. 1 and 2 the transistors employed may be PNP transistors instead of the NPN transistors as shown. The PNP transistors would, in accordance with the principles of the invention hereinbefore described, be connected in an or inverted mode.

Although the foregoing description and accompanying drawing figures set forth two rectifier circuits embodying the invention it is to be understood that the foregoing description and drawing figures are purposeful for providing examples of the invention. Many changes may be made respecting the elements, and combination of elements, of the disclosed rectifier circuits. Such changes may involve, inter alia, substitutions, modifications, rearrangements, etc., of the various elements or devices. Nevertheless, such changes may be made without departing from the spirit of the invention or from the scope of the claims hereinafter set forth.

What is claimed is:

1. A full wave active rectifying circuit comprising a first transformer having a ferrite magnetic core and a winding with a center tap and two ends for supplying high frequency alternating-current input voltage with a frequency between 20 and 50 kilohertz, a second transformer having a common magnetic core made of ferrite material and only four magnetically coupled windings including first and second pairs of opposite winding polarity primary and secondary windings, one end of said first pair of primary and secondary windings being connected together and to one end of said first transformer winding, and one end of said second pair of primary and secondary windings being connected together and to the other end of said first transformer winding, first and second substantially alternately conductive silicon junction transistors each connected for inverted mode operation and each having an emitter, a base, a collector and a collector-base junction, said collectors being connected together and defining a first output terminal, the other ends of said first pair of primary and secondary windings being connected respectively to the emitter and base of said first transistor such that voltage blockage is performable by the collector-base junction thereof, the other ends of said second pair of primary and secondary windings being connected respectively to the emitter and base of said second transistor such that voltage blockage is performable by the collector-base junction thereof, and a diode connected between the emitter and collector of each of said first and second transistors with a polarity to conduct in the same direction as said respective transistors, and a capacitor connected directly between said first output terminal and a second output terminal which is in turn effectively connected to the center tap of said first transformer winding.

2. A rectifying circuit according to claim 1 wherein said first and second transistors further are NPN transistors, and said diode connected between the emitter and collector of each transistor has an anode connected to said emitter and a cathode connected to said collector.

* * * * *